Sept. 2, 1924.

O. P. SMITH

STARTING CAGE FOR RACING DOGS

Filed May 16, 1921

1,507,439

Owen P. Smith
By Chester W. Brown
his Attorney

Patented Sept. 2, 1924.

1,507,439

UNITED STATES PATENT OFFICE.

OWEN P. SMITH, OF CHICAGO, ILLINOIS.

STARTING CAGE FOR RACING DOGS.

Application filed May 16, 1921. Serial No. 470,080½.

*To all whom it may concern:*

Be it known that I, OWEN P. SMITH, a citizen of the United States, residing at the city of Chicago, in the county of Cook and State of Illinois, have invented certain new and useful Improvements in Starting Cages for Racing Dogs, of which the following is a specification.

This invention relates to starting cages for dogs in dog racing courses, and the object is to provide such a cage, in which the dogs will be held in separate stalls until the time to release them, and then they are all to be released simultaneously as the barrier is raised.

A special object of this present invention is to provide means of protecting the dogs against injury in the cage.

And another object is to provide efficient means for quickly removing the barrier out of the way of all of the dogs at the same time, giving all an equal opportunity to join in the chase.

With the above and other objects in view, my invention consists of the arrangement and combination of parts as hereinafter described and claimed, and while the invention is not restricted to the exact details of construction disclosed herein, yet, for the purpose of illustrating a particular embodiment thereof, reference is had to the accompanying drawings, in which like reference characters designate the same parts in the several views, and in which:

Figure 1:
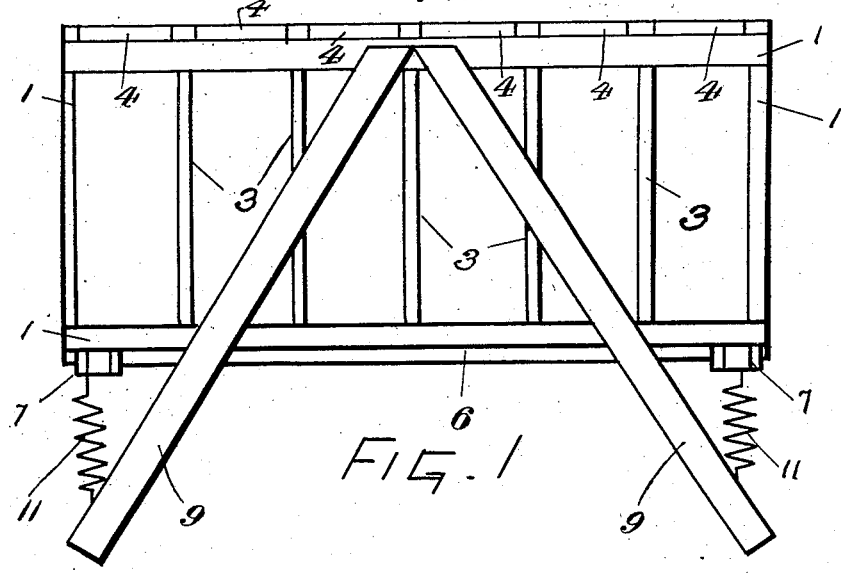
Figure 1 is a top plan view of one of my cages.
Figure 2:
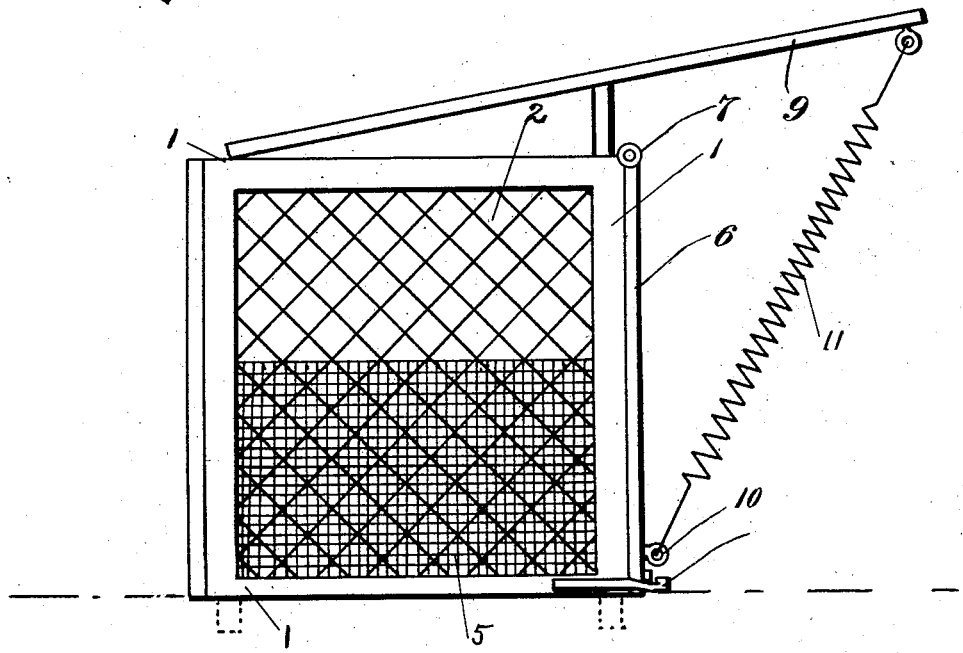
Figure 2 is an end elevation thereof.

In the construction of my said starting cage, I have preferably formed a frame work of timbers as 1, 1, and upon this frame work have attached wire screen 2, of a mesh suitable for the purpose. By means of the partitions 3, 3, also covered with screen, I have divided said cage into the required number of individual stalls, as one for each dog entered in the race. At the rear of each stall I have provided a separate door, as 4 for each stall, suitably hinged and latched, for use in admitting the dogs to the respective stalls. To protect the dogs from injury against the wire screen, I have covered the lower part, up to about the height of the shoulder of the dogs, with suitable cloth or canvas 5, as shown.

At the front of the cage I have provided the door 6, opening outwardly and upwardly, being mounted by hinges as 7, 7 at the top of the cage, and having the latch 8 near the bottom of the cage to hold it in position when closed. For the purpose of opening said door 6 quickly, when the latch 8 is released, I have provided the timbers 9, 9, extending above, and out in front of the cage, as shown, and attached to the end thereof are the coiled tension springs 11, 11. The lower ends of the springs 11, 11, are attached in suitable eyes, as 10, 10 near the lower edge of the door 6.

By this construction, when it is desired to use the starting cage, the door 6 is closed, and fastened by the latch 8. The dogs are placed in their respective stalls through the doors 4, 4 at the rear. When it is desired to release the dogs for the race, the latch 8 is released, and the tension springs 11 raise the door 6 quickly above and out of the path of the dogs as they pass out of said cage through the front.

It will be apparent that other means may be employed to raise the door 6, and other means may be employed to protect the dogs against injury in the stalls, without departing from the spirit of my said invention.

Having thus described my said invention, what I claim and desire to secure by Letters Patent, is the following:—

In a starting cage for racing dogs, a frame comprising a box-like structure divided into a plurality of compartments and comprising walls formed of wire mesh partially covered with fabric, individual rear doors for each of the compartments and a single front door hinged at its upper end to the top walls of the frame, divergent inclined members secured to the top of the said frame and extending upwardly and outwardly beyond the face of the front door and having their outer ends in the plane of the side walls of the box-like structure, springs secured to the outer ends of said inclined members and to the door and lying in the plane of the hinges, and a latch at the bottom of the cage for coaction with the lower edge of the front door to hold the front door normally closed against the tension of said springs, said springs adapted to raise the front door upon release of the latch.

In testimony whereof, I have hereunto set my hand in the presence of two subscribing witnesses.

OWEN P. SMITH.

In presence of—
CHESTER W. BROWN,
RICHARD GREEN.